Jan. 30, 1951        A. DEFOSSE        2,539,730

COMPOSITE RIM AND METHOD OF MANUFACTURING THE SAME

Filed Nov. 2, 1948

Inventor:
Armand Defosse
By
E. F. Stenderoth atty

Patented Jan. 30, 1951

2,539,730

UNITED STATES PATENT OFFICE 2,539,730

COMPOSITE RIM AND METHOD OF MANUFACTURING THE SAME

Armand Defosse, Jeumont, France, assignor to la Societe anonyme dite: Forges & Ateliers de Constructions Electriques de Jeumont, Paris, France, a corporation of France Application November 2, 1948, Serial No. 57,872
In France November 10, 1947

4 Claims. (Cl. 74—572)

This invention relates to a composite rim and a method for manufacturing the same.

An object of the invention is to provide a construction of a composite rim wherein the clamping bolts, ordinarily subjected to multiple stresses as a result of centrifugal forces tending to elongate the rim, are relieved from such stresses as much as possible.

A further object of the invention is to provide a construction of a rim wherein radial and tangential displacements of the outer clamping members with respect to the inner members is eliminated thereby eliminating bending stresses upon the clamping bolts.

A still further object is to provide interconnecting members between the outer clamping members and the inner members constituting the rim.

An additional object is to provide a construction of a composite rim which is suitable for fly wheels, electric machines and the like wherein the cohesion of the component parts is secured in a positive and surer manner by supporting surfaces especially provided for this purpose and not by friction as at present.

With the above and other objects in view which will become apparent from the detailed description below a preferred embodiment of the invention is shown in the drawings in which.

In the various figures similar parts are indicated by like reference characters.

Figure 1:
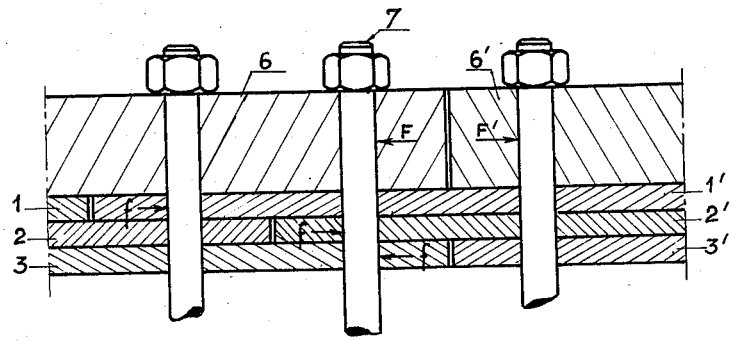
Fig. 1 is a partial cross-sectional view with parts in elevation of a usual composite rim illustrating the disadvantages to be overcome.

In a composite rim constructed according to the usual system as shown particularly in Fig. 1 the inner segments form the various layers 1, 1', 2, 2', 3, 3', etc., which are compressed by clamping members such as 6, 6', etc. The bolts 7 which effect the assembly are subject to multiple stresses which result from the centrifugal forces tending to elongate the rim. Assuming any distribution whatever of the joints between the various segments and taking into account the tangential stresses that tend to separate the juxtaposed segments, it can be seen that bolt 7, for example, has to withstand numerous contrary and relatively slightly spaced forces f, and also a greater force F due to the action of the relatively thick clamping member 6. This force F exerts a bending effect on the overhanging part of the bolt 7, i. e. it attacks it under most unfavorable conditions, and these conditions are usually also aggravated, owing to the cross-section of the bolts being decreased by threading. The solidity of the rim may be endangered in some cases by the excessive stresses that occur under these conditions on the said overhanging ends of the assembly bolts.

Figure 2:
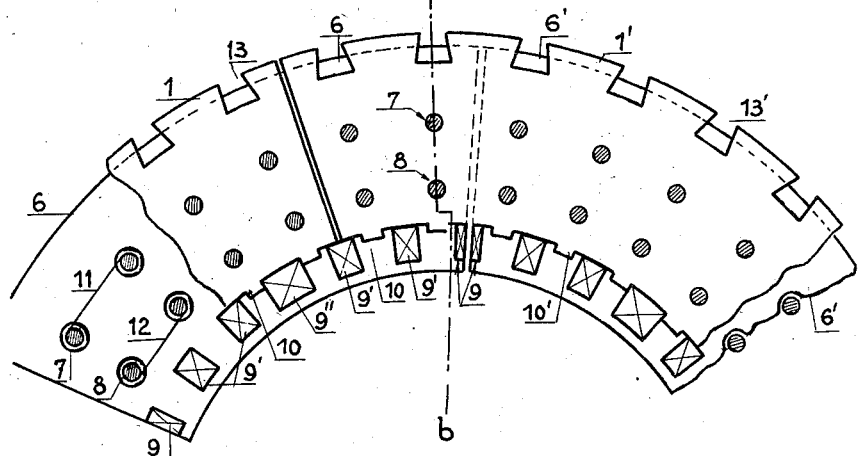
Fig. 2 is a partial side elevational view with parts in cross-section of a preferred embodiment of the invention.
Figure 3:
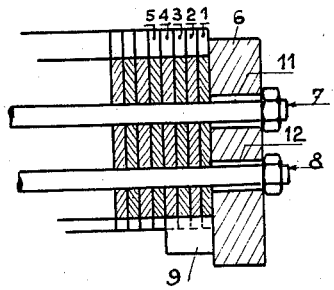
Fig. 3 is a cross-sectional view with parts in elevation taken on section line a—b of Fig. 2.

In order to overcome the above disadvantages and to eliminate all undesirable bending stresses in the clamping bolts, a construction such as shown in Figs. 2 and 3 is used.

In Fig. 2 two adjacent outer segments 6 and 6' are shown with two of the inner segments 1 and 1' placed thereon. The inner segments are provided with slots or notches such as 13 and 13' which may be used for the attachment of various other members such as projecting poles in electrical machines.

In order to prevent relative slipping each outer segment is provided with suitably shaped projections having the form of abutments such as 9, 9', 9'', etc., which engage the inner circumference of the rim built up from the elements 1, 2, 3, etc. as is shown more clearly in Figure 3. This will prevent the element 6 from moving away from the axis of rotation.

Each inner segment has a series of regularly spaced projections or teeth 10, between which the elements 9, 9', and 9'' engage. The engaging elements 9, and 9' are preferably of a width less than the spacing between two neighboring teeth but the projection 9'' located at the middle of each outer segment fits without any play into the space between its adjacent teeth thus preventing any tangential movement of the outer segments 6 and 6' relative to the rim.

In addition Figure 3 shows that the holes 11 and 12 provided in the outer segments for the bolts 7 and 8 have a diameter greater than the diameter of such bolts. This permits free expansion of the rim relative to the elements 6, 6', etc.

Besides this advantage of free expansion, it is seen that the important centrifugal forces F, which are developed in the known structures by the relatively heavy clamping segments 6, 6', are no more transferred to the overhanging end portions of the clamping bolts 7 and 8. They are now entirely transmitted to the rim elements 1, 2, 3, etc. by the action of abutments formed by the projections 9, 9' and 9'' which are provided upon the said elements 6, 6'.

Thereby the bolts 7 and 8, which are crossing without play the inner segments 1, 2, 3, etc. and with a considerable clearance the segments 6, are completely relieved from the dangerous bending forces F, and their central portions are only submitted to the shearing forces f shown in Figure 1 and resulting from the centrifugal actions.

Those forces f are obviously increased by the centrifugal action of the clamping members, and the central portions of the said clamping bolts have to carry all of the weight, but because of the small thickness of the elements 1, 2, 3, 4, etc., the forces f are acting at small distances from one another, so that they are distributed in a manner to be easily resisted.

I claim:

1. In a composite rotating rim formed by a plurality of adjacent inner segments and by outer adjacent clamping segments of greater thickness, clamping bolts crossing without play the said inner segments to withstand all shearing stresses due to centrifugal forces and means for freeing the overhanging end portions of the said bolts from bending stresses due to centrifugal action of the said outer segments, comprising inwardly directed projections upon the said outer segments, said projections having the form of positive abutments bearing radially against the inner circumferences of a part of said inner segments, in order to transfer the totality of centrifugal forces of the said clamping segments to the central portions of said clamping bolts.

2. In a composite rotating rim formed by a plurality of adjacent inner segments and by outer adjacent clamping segments of greater thickness, clamping bolts crossing without play the said inner segments to withstand all shearing stresses due to centrifugal forces and means for freeing the overhanging end portions of the said bolts from bending stresses due to centrifugal action of the said outer segments, comprising inwardly directed projections upon the said outer segments, said projections having the form of positive abutments bearing radially against the inner circumferences of a part of said inner segments, in order to transfer the totality of centrifugal forces of the said clamping segments to the central portions of said clamping bolts, said outer segments having apertures for said bolts of greater diameter than said bolts.

3. In a composite rotating rim formed by a plurality of adjacent inner segments and by outer adjacent clamping segments of greater thickness, clamping bolts crossing without play the said inner segments to withstand all shearing stresses due to centrifugal forces, means for freeing the overhanging end portions of the said bolts from bending stresses due to centrifugal action of the said outer segments, comprising inwardly directed projections upon the said outer segments, said projections having the form of positive abutments bearing radially against the inner circumferences of a part of said inner segments, in order to transfer the totality of centrifugal forces of the said clamping segments to the central portions of said clamping bolts, said outer segments having apertures for said bolts of greater diameter than said bolts and spaced teeth upon the said inner segments, at least one of said projections being tightly inserted between said teeth to counteract tangential displacements of said outer segments.

4. In a rotating composite rim formed by adjacent inner segments interposed between heavier outer clamping segments, a plurality of clamping bolts crossing without clearance the said inner segments to resist to all centrifugal forces, and means for relieving the ends of said bolts from bending stresses due to the centrifugal forces of said outer clamping segments, comprising radial teeth upon the inner circumferences of said inner segments, inwardly directed projections upon the said clamping segments, inserted between the said teeth to form positive stops against a part of the said inner segments, and bolting apertures in the said outer segments having a greater diameter than said bolts, whereby the central portions only of said bolts are subjected to shearing stresses resulting from the totality of centrifugal forces.

ARMAND DEFOSSE.

REFERENCES CITED

The following references are of record in the file of this patent:

UNITED STATES PATENTS

| Number | Name | Date |
|---|---|---|
| 1,817,054 | Baudry | Aug. 4, 1931 |

FOREIGN PATENTS

| Number | Country | Date |
|---|---|---|
| 520,513 | Great Britain | Apr. 25, 1940 |